Figure 1:
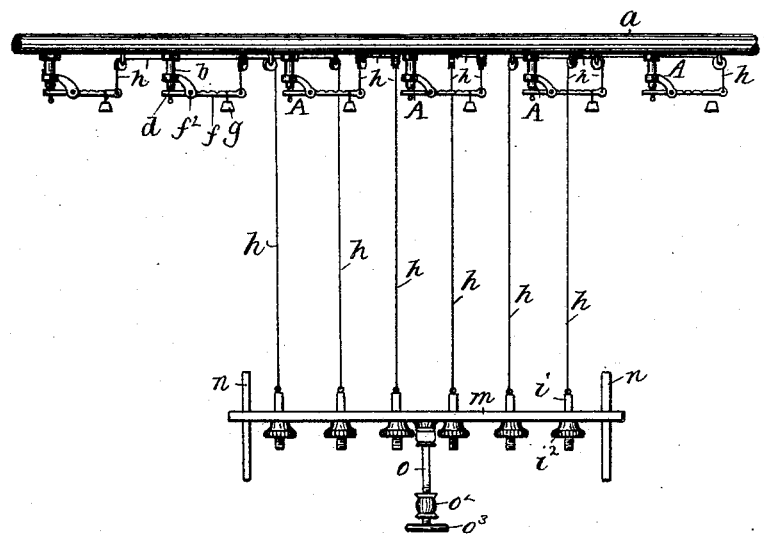

(No Model.)

C. C. HANFORD & C. D. STANFORD.
APPARATUS FOR COOLING MALT LIQUORS.

No. 479,419. Patented July 26, 1892.

Witnesses,
Jas. J. Maloney.
W. J. Locke.

Inventors,
C. C. Hanford and
C. D. Stanford
by Jos. P. Livermore
Att'y.

UNITED STATES PATENT OFFICE.

CLARENCE C. HANFORD, OF MEDFORD, AND CHARLES D. STANFORD, OF BOSTON, MASSACHUSETTS.

APPARATUS FOR COOLING MALT LIQUORS.

SPECIFICATION forming part of Letters Patent No. 479,419, dated July 26, 1892.

Application filed October 4, 1889. Serial No. 326,007. (No model.)

*To all whom it may concern:*

Be it known that we, CLARENCE C. HANFORD, of Medford, county of Middlesex, and CHARLES D. STANFORD, of Boston, county of Suffolk, in the State of Massachusetts, have invented an Improvement in Apparatus for Cooling Malt Liquors, of which the following description, in connection with the accompanying drawings, is a specification, like letters on the drawings representing like parts.

Our invention relates to an apparatus for cooling malt liquors in accordance with the process shown in Letters Patent No. 382,155, granted May 1, 1888, to which reference may be had. In the apparatus employed for carrying out this process spraying tubes or nozzles are used, from which the wort taken from the boiling-kettle is delivered under pressure to the atmosphere for the purpose of cooling and aerating the same, and various kinds of spraying tubes or nozzles have been devised for the purpose of insuring the delivery of the liquid in the form of a fine spray without danger of clogging the nozzles, and with provision for opening the nozzles widely for the purpose of cleaning or flushing them out. Application Serial No. 296,427, filed January 15, 1889, by M. Hanford, shows a spraying device adapted for this purpose, and the present invention relates, mainly, to the means for operating the several spraying devices constructed substantially as shown in that application, forming part of the apparatus for cooling and aerating liquids in accordance with the method before referred to. The said spraying device consists, mainly, of a tube or nozzle connected at one end with the delivery-pipe and open at its other end, which open end is made like a valve-seat to receive a tapering plug or deflector, which when held near the open end forms therewith a very narrow annular flaring orifice, which causes the liquid to break up into very fine spray when delivered from said orifice. The said deflector is supported on a lever provided with a counter-weight or equivalent, which retains the deflector in position near the open end of the tube with an action somewhat like that of a safety-valve, and the movement of said lever in the direction to bring the deflector toward the end of the tube is limited by an adjusting device, so as to control the size of the orifice while the lever is free to move in the other direction when required in order to open said orifice wide for the purpose of flushing out the passage.

The present invention relates to the means for adjusting and operating the levers of the spraying devices, such as just described. It is found in practice to be desirable that each lever should be capable of adjustment independently of the others, and is also extremely desirable that each should be capable of opening widely independently of the others, and, furthermore, that means should be provided for retaining all of them open for any required period of time without disturbing the independent adjustment of each, for the purpose of thoroughly washing out or cleaning the entire apparatus after its operation upon the wort has been finished; and the present invention consists in means which will be hereinafter described and claimed for effecting these operations of the spraying devices.

Figure 2:
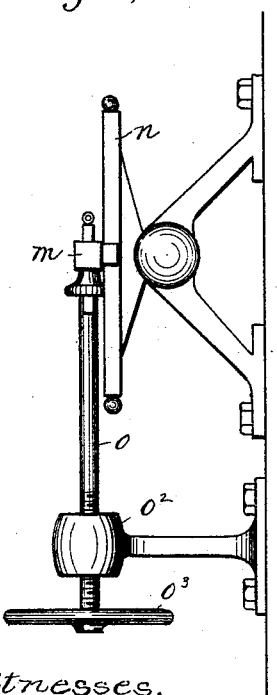
Figure 3:
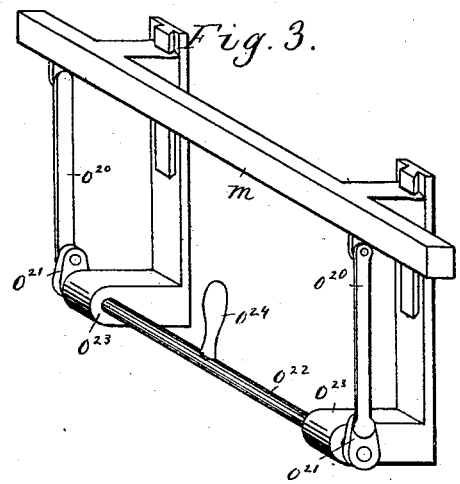

Figure 1 is a side elevation of a sufficient portion of an apparatus for cooling and aerating malt liquors to illustrate this invention; Fig. 2, an end elevation of a portion thereof on a larger scale; Fig. 3, a perspective view illustrating a modification in construction of a portion of the apparatus.

The spraying devices or nozzles A are intended to be used as part of an apparatus for cooling and aerating malt liquors in accordance with the method forming the subject of Patent No. 382,155, before referred to, and the said nozzles are themselves of substantially the same construction as shown and described in application Serial No. 296,427, filed January 15, 1889, it being sufficient for an understanding of the present case to state that it consists of a tubular body $b$, connected with and communicating with the supply-pipes $a$, through which the hot wort is forced from the boiling kettle by means of a pump or other forcing apparatus, as described in said patent, and that the bore of said tube is substantially uniform and open at its lower end, which is controlled by a tapering plug or deflector $d$, supported at one end of the lever $f$, fulcrumed at $f^2$, and provided with a counterbalance, (shown in this instance as a weight $g$,) by which the said deflector is sustained against the pressure of the outcoming liquid, retaining it in position to nearly but not quite close the opening at the end of the tube $b$, thus leaving a very narrow annular orifice at the mouth of the said tube, through which the liquid escapes. The movement of the lever under the influence of its counterbalancing force $g$—that is, the approach of the deflector toward the mouth of the tube—is limited by means of operating cords or chains $h$, extending over suitable pulleys or guides to a point easily accessible to the operator, who can thus by pulling on any one of said chains open widely the corresponding nozzle and permit it to be flushed or cleaned out by the liquid which is then flowing through it without in any way interfering with the operations of the remaining nozzles of the set for spraying the liquid delivered through them. In order to limit the movement toward the end of the spraying-tubes and to vary such limit for the purpose of adjusting the size of the annular orifice, said chains $h$ are each connected with an adjusting device, shown as a slide $i$, working in a guide in a bar $m$, and adjusted by a nut $i^2$, bearing against said bar $m$ and working on a threaded portion of the slide $i$.

The devices thus far described are substantially the same as those shown and described in said application of M. Hanford, Serial No. 296,427, and are not herein claimed, except in combination with the mechanism which will now be described. As shown in said application, the adjusting-slides $i$ worked in a fixed or stationary guide, and there was consequently no means of operating the several spraying devices simultaneously.

It is desirable that the spraying devices should be capable of independent operation in order that any one which may become clogged while operating on the wort may be opened and flushed out without interfering with the operation of the others; but it is also desirable that they should be capable of flushing simultaneously for the purpose of washing them out with hot water after the spraying operation has been finished. In order to provide for this latter operation without interfering with the independent operation, if required, during the spraying operation, the bar $m$, to which the several operating cords or chains are attached, is itself made movable, (shown in Figs. 1 and 2 as running on guides $n$,) so that by bodily downward movement of said bar on its guides all the cords $h$ of the several spraying devices are operated simultaneously and all the nozzles opened widely for the final cleaning operation. In order to facilitate such movement of the bar and to retain it in any desired position as long as required, it may be provided with any suitable actuating mechanism, (shown in Figs. 1 and 2 as a screw $o$, connected at one end with the bar $m$ and working in a stationary nut $o^2$,) said screw $o$ being provided with a hand-wheel $o^3$ or other suitable means for rotating it, and thus depressing or elevating the bar $m$, as required.

As it will usually be necessary for the bar $m$ to move bodily only between two certain definite positions—namely, that in which the nozzles are wide open and that in which they are in normal operative condition—other mechanism may be used for actuating the bar $m$—such, for example, as that shown in Fig. 3, in which said bar is connected by links $o^{20}$ with cranks $o^{21}$ on a rock-shaft $o^{22}$, working in stationary bearings $o^{23}$ and provided with a handle $o^{24}$. Thus by turning the handle $o^{24}$ through an arc of one hundred and eighty degrees the bar $m$ will be moved down double the throw of the cranks $o^{21}$, and will remain in this position until the handle $o^{24}$ is turned up again.

Other modifications in the means for moving the bar $m$ will readily suggest themselves to persons familiar with mechanical construction, and the invention is not limited to any specific actuating mechanism, the essential feature being to provide, in combination with the nozzles, as described, means for opening all said nozzles simultaneously and retaining them so long as necessary without interfering with their independent movement and adjustment when operating with the contracted orifice to produce the fine spray.

We claim—

1. The combination of a series of spraying devices or delivery-tubes, each having a deflector controlling the orifice thereof and a support for said deflector, with a movable bar and flexible connectors between said bar and each of said deflector-supports, as described, and means for operating said bar, whereby all the said deflectors may be moved simultaneously, each deflector being movable independently of the others by its flexible connectors, substantially as and for the purpose set forth.

2. The combination, with a series of spraying devices or delivery-tubes, each having a deflector controlling the orifice thereof and a lever connected with said deflector, of cords or chains connected with said levers and a movable bar and adjustable connectors by which said cords are adjustably connected with said bar, substantially as and for the purpose described.

In testimony whereof we have signed our names to this specification in the presence of two subscribing witnesses.

CLARENCE C. HANFORD.
CHARLES D. STANFORD.

Witnesses:
JOS. P. LIVERMORE,
M. E. HILL.